United States Patent [19]

Orgeolet et al.

[11] Patent Number: 5,704,522
[45] Date of Patent: Jan. 6, 1998

[54] DEVICE FOR LIMITING LIQUID LOSS, SUITABLE FOR A PRESSURIZED LIQUID DISPENSER

[75] Inventors: Alain Orgeolet, Villeneuve d'Asq; Pierre Stassen, Lehon; Yannick Lallinec, Quimper; Gilbert Rault, Yffiniac, all of France

[73] Assignee: Total Raffinage Districution S.A., Puteaux, France

[21] Appl. No.: 617,390

[22] Filed: Mar. 18, 1996

[30] Foreign Application Priority Data

Mar. 17, 1995 [FR] France ................ 95 03105

[51] Int. Cl.$^6$ .......................................... B65D 5/72
[52] U.S. Cl. .............................. 222/494; 222/571
[58] Field of Search .................... 222/29, 494, 512, 222/517, 571; 141/115, 198, 302, 392

[56] References Cited

U.S. PATENT DOCUMENTS

| | | | |
|---|---|---|---|
| 2,291,603 | 8/1942 | Barker | 251/119 |
| 4,062,480 | 12/1977 | Bjorklund | 222/571 |
| 4,213,488 | 7/1980 | Pyle | 141/1 |
| 4,410,108 | 10/1983 | Minard | 222/571 |
| 4,739,906 | 4/1988 | LoTurco | 222/494 |

FOREIGN PATENT DOCUMENTS

| | | | |
|---|---|---|---|
| 1 014 867 | 8/1957 | Germany . | |
| 116159 | 8/1969 | United Kingdom | 222/494 |
| WO 88/09867 | 12/1988 | WIPO . | |

*Primary Examiner*—Philippe Derakshani
*Attorney, Agent, or Firm*—Curtis, Morris & Safford, P.C.

[57] ABSTRACT

A device for limiting liquid loss in pressurized liquid dispensers having a membrane, which is elastically deformable and capable of occupying two positions, namely: (a) a resting position in which it has three support zones, namely on a first bearing surface and a second bearing surface and on the protruding part of head of knob; and (b) a deformed position in which its end of larger diameter is raised from the first bearing surface by the stress exerted by the pressurized liquid so as to leave a free passage for said liquid, membrane in this position, however, remaining in contact with the second bearing surface and with the protruding part of knob head.

20 Claims, 2 Drawing Sheets

DEVICE FOR LIMITING LIQUID LOSS, SUITABLE FOR A PRESSURIZED LIQUID DISPENSER

RELATED APPLICATION

This application claims priority to French Application No. 95 03105, filed Mar. 17, 1995, incorporated herein by reference.

BACKGROUND OF THE INVENTION

1. Field of the Invention

The present invention relates to a device for limiting liquid loss in a pressurized liquid dispenser.

2. Description of the Related Art

Liquid dispensers are used to fill different kinds of containers including bottles, cans or flasks. In particular, liquid nozzles are often used for dispensing liquid fuel, for example, nozzles used for dispensing fuel into automobiles. During filling, the dispensing elements retain the liquid at the level of their inlet surfaces intended to come in contact with the liquid. This retained liquid then has a natural tendency to drain after the filling has been discontinued and the dispenser has been separated from the liquid receiver or container. This not only results in the loss of liquid, but also in harm to the environment. In the case of toxic or flammable materials, this spillage may present a risk to persons coming in contact with the materials and/or a risk of fire as a result of the spillage.

The purpose of the present invention is to eliminate these drawbacks by means of a device for limiting liquid loss, the device being readily adaptable to a pressurized liquid dispenser and reducing considerably the liquid loss inherent in their dispensing mode.

OBJECTS OF THE INVENTION

It is an object of the present invention to provide a device for limiting liquid loss in liquid dispensers and being readily adaptable to such dispensers.

It is another object of the invention to provide a device suitable for limiting liquid loss in pressurized liquid dispensers.

It is yet another object of the invention to provide a device for limiting liquid loss in pressurized liquid fuel dispenser nozzles, such as gasoline pumps.

It is a still further object of the invention to provide a device for limiting liquid loss in a pressurized liquid dispenser that also allows for the compatible use of an overflow detection device.

The foregoing and other objects and advantages of the invention will be set forth in or apparent from the following description.

SUMMARY OF THE INVENTION

The invention relates to a device for limiting liquid loss, that is adaptable particularly to a tubular pressurized liquid dispenser having an elongated tubular nozzle extension beyond the valve shut-off position. The device comprises an elastic membrane that can be elastically deformed by the pressure from the liquid being dispensed. The membrane is thus displaced to an open position that allows for the passage of liquid. Under the stress exerted by the liquid and as soon as this pressure exceeds a relatively low set value, the membrane will deform and detach itself from a first bearing surface of a tubular element acting as its seat forming an opening for liquid flow. The membrane will remain in the deformed position deflected from its seat at a liquid flow pressure that is even lower than the set value, i.e., the flow pressure necessary to maintain the deformed position is less than that necessary initially to deflect the membrane into the deformed position.

When the pressurized liquid no longer exerts a stress on the membrane, namely when the liquid dispensing process is interrupted, the membrane, because of its elasticity, will rebound back to the bearing surface of the tubular element serving as its seat (i.e., the resting position) where it will again be supported and will transversely and hermetically seal the tubular element and close the opening so as to reduce spillage and also to prevent foreign bodies and foreign matter from penetrating into the dispensing system from the outside.

The liquid retained inside the device will be removed during the next dispensing operation (without spilling from the device while said dispenser is being handled).

In other words, the invention can relate not only to the add-on device, but also to a dispenser equipped with such a device having "non-spill" characteristics. This term indicates an element that prevents any untimely and/or undesired flow after shut-off of the liquid that is being dispensed.

According to one preferred embodiment, the device comprises:

(a) a main tubular element capable of being fixed at its periphery to the free end of the dispenser, said main tubular element comprising an internal tubular part of smaller diameter which is rigidly connected to the main tubular element and is coaxial therewith and passages for the pressurized liquid being provided between the internal tubular part and the main tubular element;

(b) an elastic membrane having the shape preferably of a truncated cone and capable of supporting itself by its larger-diameter end on a first bearing surface of the main tubular element and by its smaller-diameter end on a second bearing surface of said internal tubular part or of an element firmly connected with said internal tubular part, the second bearing surface being disposed downstream from the first bearing surface in the direction of liquid flow;

(c) a central knob whose stem is inserted into said tubular bearing surface, said knob comprising a head which is disposed downstream from said membrane in the direction of liquid flow and whose protruding part, facing in the upstream direction, is in contact with the membrane surface facing downstream;

wherein the membrane is elastically deformable so as to be able to occupy two positions, namely:

(A) a resting position in which it has three support zones, i.e., against the first bearing surface, against the second bearing surface and against the protruding part of the knob head, and (B) a deformed position in which its larger-diameter end is raised from the first bearing surface by the stress exerted by the pressurized liquid thus forming a free passage for said liquid, the membrane in this position, however, remaining in contact with the second bearing surface and with the protruding part of the knob head.

The device according to the invention has the advantage that it does not appreciably disturb the regulating and control systems associated with the liquid dispenser. Moreover, it allows the liquid to be dispensed at approximately the same flow rate as does a dispenser devoid of the device, and it does not interfere with dispensing at a low flow rate thus allowing the addition of more liquid, if necessary.

The device according to the invention also constitutes an efficient barrier against the penetration of external contaminants into the liquid present inside the liquid dispenser.

Such a liquid loss-limiting device is particularly well suited for discharge nozzles of fuel dispensers (for regular and premium gasoline or diesel fuel) used in service stations, but it is also suitable for dispensers of other kinds of liquids, particularly toxic materials, food products (milk, wine, etc), soiling products and costly liquid pharmaceutical products for which it is important to minimize loss.

The tests to be described further below in the present description show that liquid loss can be reduced by a factor or at least 10 and often much higher compared to a dispenser not equipped with the device according to the invention.

According to a further preferred aspect of the invention, the protruding part of the head of the central knob defines a support zone bearing on the membrane which is closer to the downstream than to the upstream end of the membrane, in the direction of liquid flow. The membrane can thus be raised more easily from the first bearing surface of the tubular element by the action of the liquid under pressure.

Preferably, second bearing surface consists of the downstream end surface of the inner tubular part.

The central knob can have the general shape of, for example, a mushroom whose head, facing downstream, is in contact with the membrane by a peripheral bead and whose stem, disposed axially relative to the tubular element, is rigidly connected with said head and rigidly attached to said internal tubular part.

According to a further preferred embodiment, the inner tubular element is an integral part of the device and is rigidly connected to the main tubular element by means of spider arms or flanges disposed in planes passing through the axis of said main tubular element and between which orifices are defined through which the pressurized liquid is free to circulate.

The device according to the invention can be firmly connected to the pressurized liquid dispenser by any means known in the art. Preferably, the device is screwed onto said dispenser or force-fitted on or into it like an end piece.

According to still another embodiment of the invention, the central knob is detachable from the internal tubular part so as to allow for the replacement of the membrane if the membrane becomes worn, torn or otherwise not fully operable. Preferably, the knob either screws out or may be pulled out.

Said device can be made of any desired material, particularly a rigid plastic material such as nylon, which will allow it to be introduced into a liquid container, particularly into the fuel tank of automotive vehicles, without causing any damage.

While the entire device within broader aspects of the invention could be made as a single unitary piece molded from an elastomeric compound, this would be typically less preferred due to current higher costs of elastomers and associated greater design and fabrication costs.

The dimensions and the shape of the tubular elements constituting the device according to the invention will, naturally, be adapted to the nature of the liquid to be dispensed, the dispensing pressure and the desired flow rate.

In the case where the device according to the invention is fitted onto a fuel dispensing nozzle which must penetrate into the fuel tank of a vehicle, said nozzle may, as usual, comprise an overflow detection channel which commands the liquid flow to stop automatically when the liquid level in the tank reaches the nozzle. The operation of this detection channel will not be affected in any way by the presence of the device according to the invention. Advantageously, the device according to the invention can thus consist of parts made of plastic materials judiciously chosen not to cause deterioration of the liquid container when they come in contact with it.

BRIEF DESCRIPTION OF THE DRAWINGS

In this specification and in the accompanying drawings, I have shown and described preferred embodiments of my invention and have suggested various alternative and modifications thereof; but it is to be understood that these are not intended to be exhaustive and that many other changes and modifications can be made within the scope of the invention. The suggestions herein are selected and included for purposes of illustration in order that other skilled in the art will more fully understand the invention and the principles thereof and will thus be enabled to modify it in a variety of forms, each as may be best suited to the conditions of a particular use.

DESCRIPTION OF THE PREFERRED EMBODIMENTS

Figure 1:
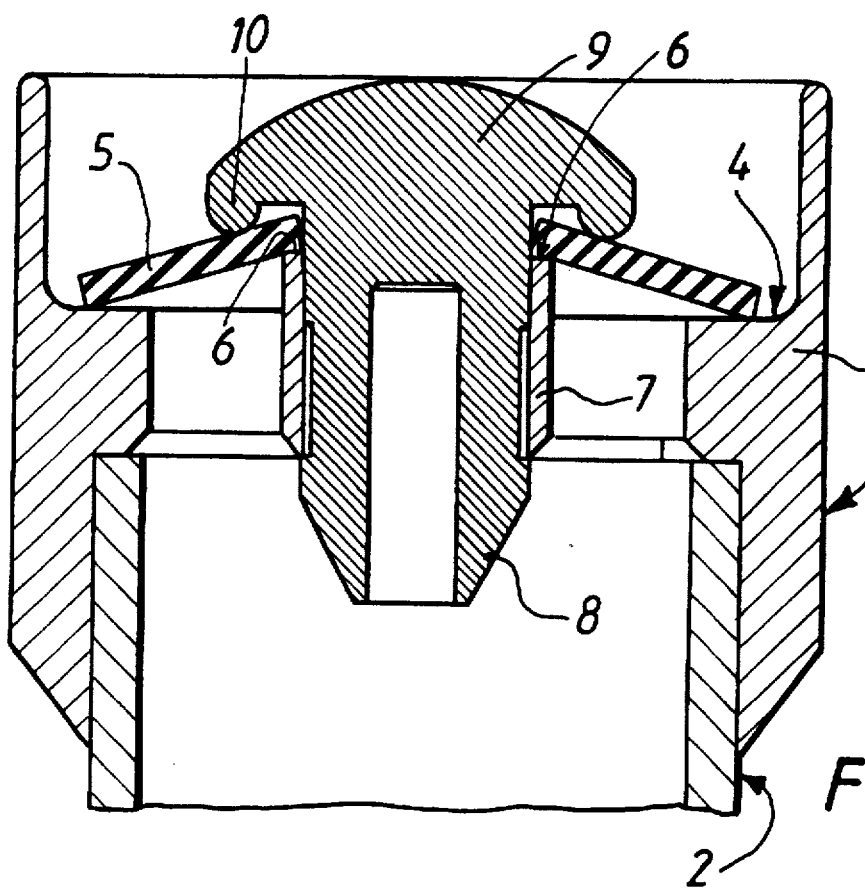
FIG. 1 represents a partially schematic vertical section of a device illustrating a preferred embodiment of the invention, disposed at the end of the tubular element of a pressurized liquid dispenser (such as a gasoline pump nozzle) and shown with the membrane of the device in the closed position (i.e. not stressed by pressurized liquid)
Figure 2:
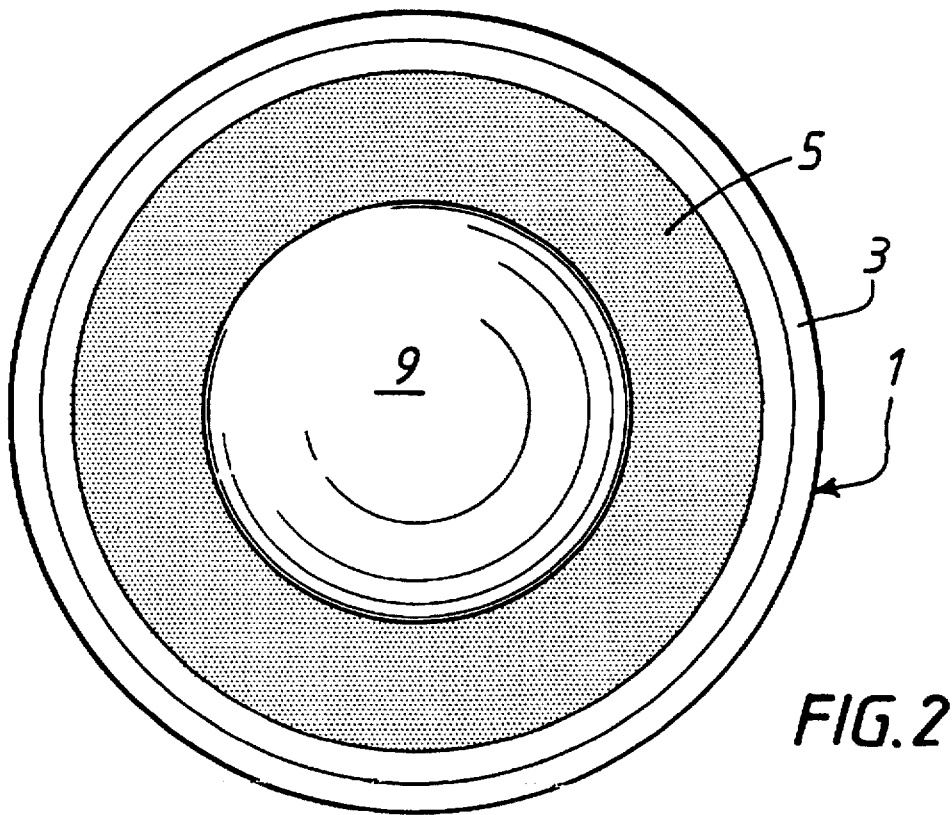
FIG. 2 represents an end view of the device shown in FIG. 1.
Figure 3:
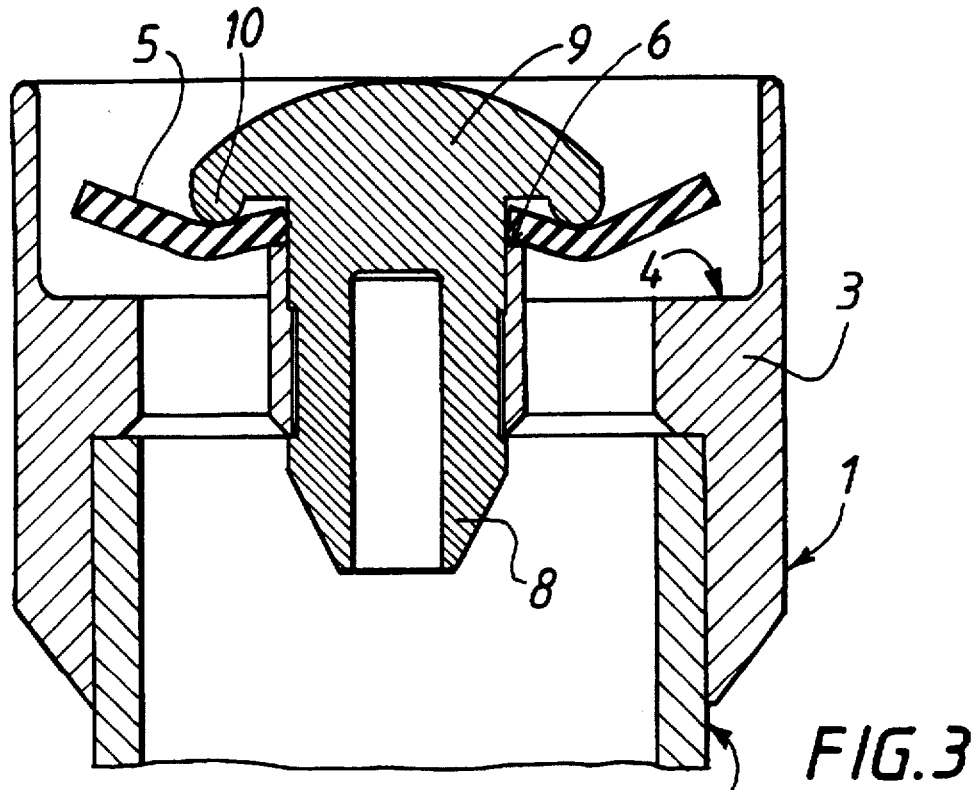
FIG. 3 represents a view similar to that of FIG. 1, with the membrane in the position assumed when stressed by liquid under pressure which allows the liquid to flow.

Referring to FIGS. 1 and 3, a device illustrating a preferred embodiment of the invention, indicated by the general reference numeral 1, is shown force-fitted to the end of tube 2 of a liquid dispenser. As indicated hereinabove, device 1 could also be screwed onto tube 2 or rigidly connected thereto by some other means.

Device 1 comprises a main tubular element 3 with a central aperture, said element covering the end of tube 2, and whose shoulder 4 defines a first bearing surface for a membrane 5 having a preferably truncated cone-shape and made of deformable elastic material, for example an elastomer, which acts as a seal. The larger-diameter base portion of membrane 5 rests on shoulder 4 engaging the latter with its outer periphery by that surface of the membrane 5 which faces upstream relative to the liquid flow.

The smaller-diameter top portion of the membrane 5 is disposed downstream from shoulder 4 and with its upstream-facing surface resting on the downstream end 6 of an internal tubular part 7 of element 1. Internal tubular part 7 is disposed coaxially with main tubular element 3, is rigidly connected thereto and has a smaller diameter than said part 3.

The tubular part 7 is concentrically fixed within and spaced from the outer element 3 by the arms of a spider support, not specifically referenced, which spacing therebetween defines orifices that permit passage of the liquid.

Inside said part 7 is disposed (preferably by a snap-fit) the stem 8 of a mushroom-shaped knob 9 whose head, disposed downstream, acts by means of a peripheral bead 10 upon a portion of the circular surface of membrane 5 facing downstream, said portion being closer to the inner than to the outer periphery of the membrane.

Rather than resting on the downstream end 6 of tubular part 7, the smaller-diameter part of membrane 5 can, of course, be supported on a lateral shoulder which could be formed on the stem 8 mushroom-shaped central knob 9.

It can be seen from FIG. 3 that when the pressurized liquid flowing through tube 2 comes in contact with membrane 5 and the pressure exerted by the liquid on said membrane exceeds a set value (usually low), the larger-diameter part of membrane 5 under the stress exerted by the liquid will be flexed in the downstream direction, disengaging itself from its seat 4 and leaving space for free passage of said liquid. When the dispensing of the liquid is interrupted, the membrane 5, because of its elasticity, will immediately return to its seat 4 thus effectively preventing the spilling of any non-pressurized liquid remaining in the tube 2 upstream from the membrane of the liquid loss-limiting device 1. The retained liquid will, of course, be removed during the following liquid-dispensing operation.

The pressure at which the membrane is displaced from its seat will, of course, depend on the dimensions of said membrane, the position of the support zone on the membrane for the bead acting as a pivot, and on the nature of the resilient materials of which it is made. Nevertheless, this pressure can be as low as $0.01 \times 10^5$ Pa (0.01 bar) for a device fitted onto a fuel dispenser nozzle of the usual type, the membrane then remaining in the displaced position at an even lower pressure of about $0.0025 \times 10^5$ Pa (0.0025 bar).

The device according to the invention does not affect the usual operating conditions of the liquid dispenser. Moreover, as can be seen clearly from the drawings, said device has small dimensions and can readily be fitted onto the usual dispensing elements.

Figure 4:
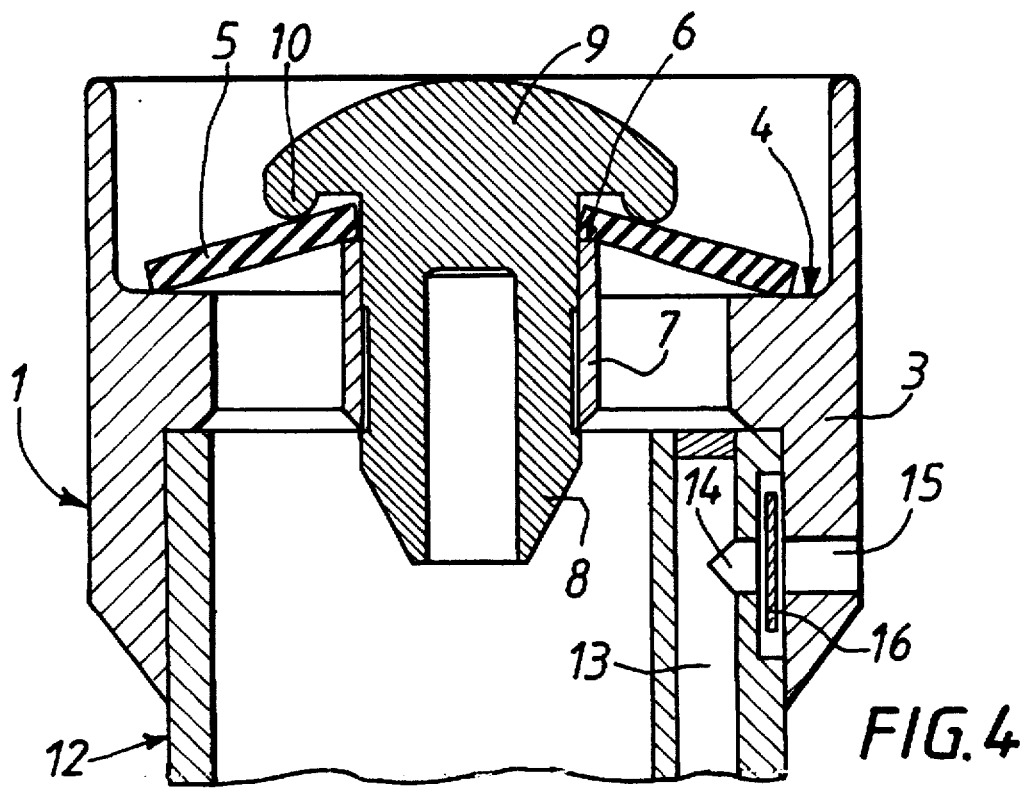
FIG. 4 represents a view similar to that of FIG. 1, showing the device according to the invention mounted on the end of the tubular element for dispensing the pressurized liquid, provided with an overflow detection channel.

FIG. 4, in which the elements already described are indicated by the same reference numerals, shows the device according to the invention fitted on a tube 12 of a dispenser equipped with an overflow detection channel 13 which communicates with the outside through a vent hole 14 provided in the wall of tube 12, through an orifice 15 provided in the side wall 3 of the tubular element opposite said vent hole 14, and through an interposed flap valve 16.

The dispensing element presenting such an overflow detection channel 13 operates in the usual manner. In other words, with the dispenser inserted into the liquid container, when the liquid level reaches membrane 5, detection channel 13 commands the liquid flow to stop automatically.

EXAMPLES

The following examples are illustrative of some of the products and methods of making the same falling within the scope of the present invention. They are, of course, not to be considered in any way limitative of the invention. Numerous changes and modification can be made with respect to the invention.

Tests were carried out with a diesel fuel-dispensing nozzle having a ZVA 08/PTB spout, sold under the name ELAFLEX. The nozzle was either equipped or not equipped with the device according to the invention to demonstrate the improvement in liquid retention brought about by said device. To this end, the spout was used either by manually stopping the dispensing of the diesel fuel or by allowing automatic flow stoppage to occur when the level of diesel fuel in the tank being filled reached the nozzle. The liquid loss that occurred under these two conditions was measured after the nozzle was allowed to drain into the tank for different lengths of time, namely for 2, 5 and 10 seconds.

The results obtained with the dispenser nozzle not incorporating the device according to the invention are collected in Table 1 hereinbelow and those obtained when the same nozzle was equipped with the liquid loss-limiting device are shown in Table 2.

TABLE 1

|  | Duration of Drainage (in seconds) | Loss after Drainage (in cm$^3$) |
| --- | --- | --- |
| Manual Check | 2 | 12 |
|  | 5 | 6 |
|  | 10 | 3 |
| Automatic Check | 2 | 35 |
|  | 5 | 9 |
|  | 10 | 3 |

TABLE 2

|  | Duration of Drainage (in seconds) | Loss after Drainage (in cm$^3$) |
| --- | --- | --- |
| Manual Check | 2 | 0.5 |
|  | 5 | 0.2 |
|  | 10 | 0.2 |
| Automatic Check | 2 | 0.8 |
|  | 5 | 0.5 |
|  | 10 | 0.5 |

It can be seen that the liquid loss is considerably reduced by the device according to the invention, namely by a factor which is always higher than 10 and can even be as high as 44.

If the diesel fuel-dispensing nozzle were used on the average 200 times per day, the cumulative loss over a period of one month of use, in the absence of the device according to the invention, would exceed 40 liters per month, whereas with the device according to the invention said loss would be about 1.5 liters.

These results clearly illustrate the efficacy of the liquid loss-limiting device described hereinabove.

We claim:

1. A liquid loss-limiting device suitable for a pressurized liquid dispenser with a shut-off valve having downstream an elongated delivery nozzle, comprising:
   (a) a main tubular element adaptable to fasten by one of its two ends to a downstream free end of said nozzle,
   (b) an internal tubular element of smaller diameter rigidly connected to said main tubular element and spaced coaxially therein so as to form axial passages available for the flow of pressurized liquid between the internal tubular element and the main tubular element;
      said main tubular element having an annular downstream facing first bearing surface, said internal tubular element supporting a concentric downstream facing second bearing surface, said second bearing surface being disposed downstream from the first bearing surface, said passages egressing between said first and second bearing surfaces;
   (c) an elastic membrane having the general shape of a truncated cone which with its end of larger diameter resting on said first bearing surface of the main tubular element and with its end of smaller diameter resting on said second bearing surface of said internal tubular element connected thereto;

(d) a central knob with an enlarged head portion and a stem portion which latter is fastened within said internal tubular element with said head disposed downstream from said membrane, said head portion having a skirt in the shape of a protruding ring portion facing upstream, which ring portion is in contact with the surface of the membrane facing downstream and between its two ends;

wherein the membrane is elastically deformable so that it can occupy two positions, said positions including:

(A) a resting position in which the membrane has three support zones comprising the first bearing surface, the second bearing surface and the protruding ring portion of the knob; and, (B) a deformed position in which the end of larger diameter is raised from the first bearing surface by the stress exerted by pressurized liquid so as to leave a free passage for said liquid, said membrane, however, remaining in contact, in this position, with the second bearing surface and with the protruding ring portion of the knob.

2. The device according to claim 1, wherein the zone of contact between the membrane and the protruding ring portion of the knob is closer to the smaller downstream end than to the larger upstream end of the membrane.

3. The device according to one of claim 2, wherein the second bearing surface consists of the downstream end of said internal tubular element.

4. The device according to one of claim 3, wherein the first bearing surface consists of an internal shoulder of the main tubular element.

5. The device according to claim 4, wherein the protruding ring portion of the knob has the shape of a bead.

6. The device according claim 1, wherein the main tubular element has an orifice adjacent its upstream end positioned and adapted to be capable of being aligned with the vent hole of an overflow detection channel to enable the latter to communicate with the device positioned on said nozzle.

7. The device according to claim 5, wherein the main tubular element and the internal tubular element are formed as a single unit joined by radial support arms.

8. A method of reducing the undesired loss of liquid from a liquid dispenser by using the device of claim 1, fitted to the free end of the nozzle of said dispenser.

9. A fuel dispenser comprising a fuel dispensing nozzle having (a) a discharge spout having an outlet end and (b) a liquid loss-limiting device as recited in claim 1 attached to said outlet end;

wherein the liquid loss-limiting device is fitted onto the outlet end of the discharge spout thereby reducing undesired liquid loss.

10. The dispenser as recited in claim 9, wherein the second bearing surface consists of the downstream end of said internal tubular element.

11. The dispenser as recited in claim 9, wherein the first bearing surface consists of an internal shoulder of the main tubular element.

12. The dispenser as recited in claim 9, wherein the protruding ring portion of the knob has the shape of a bead.

13. The dispenser as recited in claim 9, wherein said main tubular element has an orifice adjacent its upstream end positioned and adapted to be capable of being aligned with the vent hole of an overflow detection channel to enable the latter to communicate with the device positioned on said nozzle.

14. A method of using the device of claim 2, wherein said device is fitted to the free end of a liquid dispenser thereby reducing the undesired loss of liquid.

15. The device according to one of claim 2, wherein the second bearing surface consists of the downstream end of said internal tubular element.

16. The device according to one of claim 2, wherein the first bearing surface consists of an internal shoulder of the main tubular element.

17. The device according to claim 2, wherein the protruding ring portion of the knob has the shape of a bead.

18. The device according claim 2, wherein the main tubular element has an orifice adjacent its upstream end positioned and adapted to be capable of being aligned with the vent hole of an overflow detection channel to enable the latter to communicate with the device positioned on said nozzle.

19. A liquid loss-limiting device suitable for a pressurized liquid dispenser with a delivery nozzle, comprising:

(a) an elastically flexible membrane generally in the unstressed shape of a truncated cone, which is deformable to a deflected open position, being normally supported in a liquid sealing manner at its inner and outer ends by first and second support zones facing downstream and held thereagainst by support at an intermediate position around its outer surface by a third support zone facing upstream and positioned between said first two zones, and (b) a support body having a first bearing surface defining said first support zone, having a smaller concentric second bearing surface defining said second support zone, having an opposingly directed third bearing surface defining said third support zone, and having axial flow passages therethrough egressing between said first and second bearing surfaces, said second bearing surface being disposed downstream from the first bearing surface by an amount accommodating the conical shape of said membrane, whereby said membrane can assume a deformed position in which its end of larger diameter is raised from the first bearing surface by stress exerted by pressurized liquid present in said passages so as to leave a free passage for liquid through said support body, with membrane in this position, however, remaining in contact with the second and third bearing surfaces.

20. The device according to claim 19, wherein the membrane is centered on a stem of said support body that extends up through the smaller diameter end thereof and from which stem the third bearing surface is formed by a cantilevered overhang.

\* \* \* \* \*